(12) United States Patent
Masaki

(10) Patent No.: US 9,740,358 B2
(45) Date of Patent: Aug. 22, 2017

(54) ELECTRONIC APPARATUS AND OPERATING METHOD OF ELECTRONIC APPARATUS

(71) Applicant: KYOCERA CORPORATION, Kyoto (JP)

(72) Inventor: Kana Masaki, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/273,351

(22) Filed: Sep. 22, 2016

(65) Prior Publication Data

US 2017/0090623 A1 Mar. 30, 2017

(30) Foreign Application Priority Data

Sep. 28, 2015 (JP) .................................. 2015-189549

(51) Int. Cl.
| | |
|---|---|
| *G06F 3/044* | (2006.01) |
| *G06F 3/041* | (2006.01) |
| *G09G 5/00* | (2006.01) |
| G06F 3/0484 | (2013.01) |
| G06F 3/0488 | (2013.01) |

(52) U.S. Cl.
CPC ............ *G06F 3/044* (2013.01); *G06F 3/0416* (2013.01); *G09G 5/003* (2013.01); *G06F 3/0484* (2013.01); *G06F 3/0488* (2013.01); *G06F 2203/04108* (2013.01); *G09G 2360/144* (2013.01)

(58) Field of Classification Search
CPC ...... G06F 3/044; G06F 3/0416; G06F 3/0484; G06F 3/0488; G06F 2203/04108; G09G 5/003; G09G 2360/144

USPC ......................................................... 345/173
See application file for complete search history.

(56) References Cited

U.S. PATENT DOCUMENTS

| | | | |
|---|---|---|---|
| 8,884,897 B2 | 11/2014 | Sashida | |
| 2012/0084691 A1* | 4/2012 | Yun .................... | H04M 1/72519 715/769 |
| 2014/0204045 A1* | 7/2014 | Komoto ................. | G06F 3/044 345/173 |
| 2014/0354567 A1* | 12/2014 | Park ....................... | G06F 3/0488 345/173 |

FOREIGN PATENT DOCUMENTS

JP 2012-203895 10/2012

* cited by examiner

*Primary Examiner* — Dmitriy Bolotin
(74) *Attorney, Agent, or Firm* — Duane Morris LLP

(57) ABSTRACT

In one embodiment, an electronic apparatus comprises a display, a touch detector, a proximity detector, and at least one processor. The display displays no information in a first display mode and displays information in a second display mode. The touch detector has a detection mode including a first detection mode in which the touch detector detects a touch operation at a first sensitivity and a second detection mode in which the touch detector detects the touch operation at a second sensitivity higher than the first sensitivity. The proximity detector is configured to detect proximity of an object. The at least one processor is configured to set the detection mode of the touch detector. When the proximity detector detects the proximity at a switch from the first display mode to the second display mode, the at least one processor sets the detection mode to the first detection mode.

18 Claims, 9 Drawing Sheets

F I G. 1 2
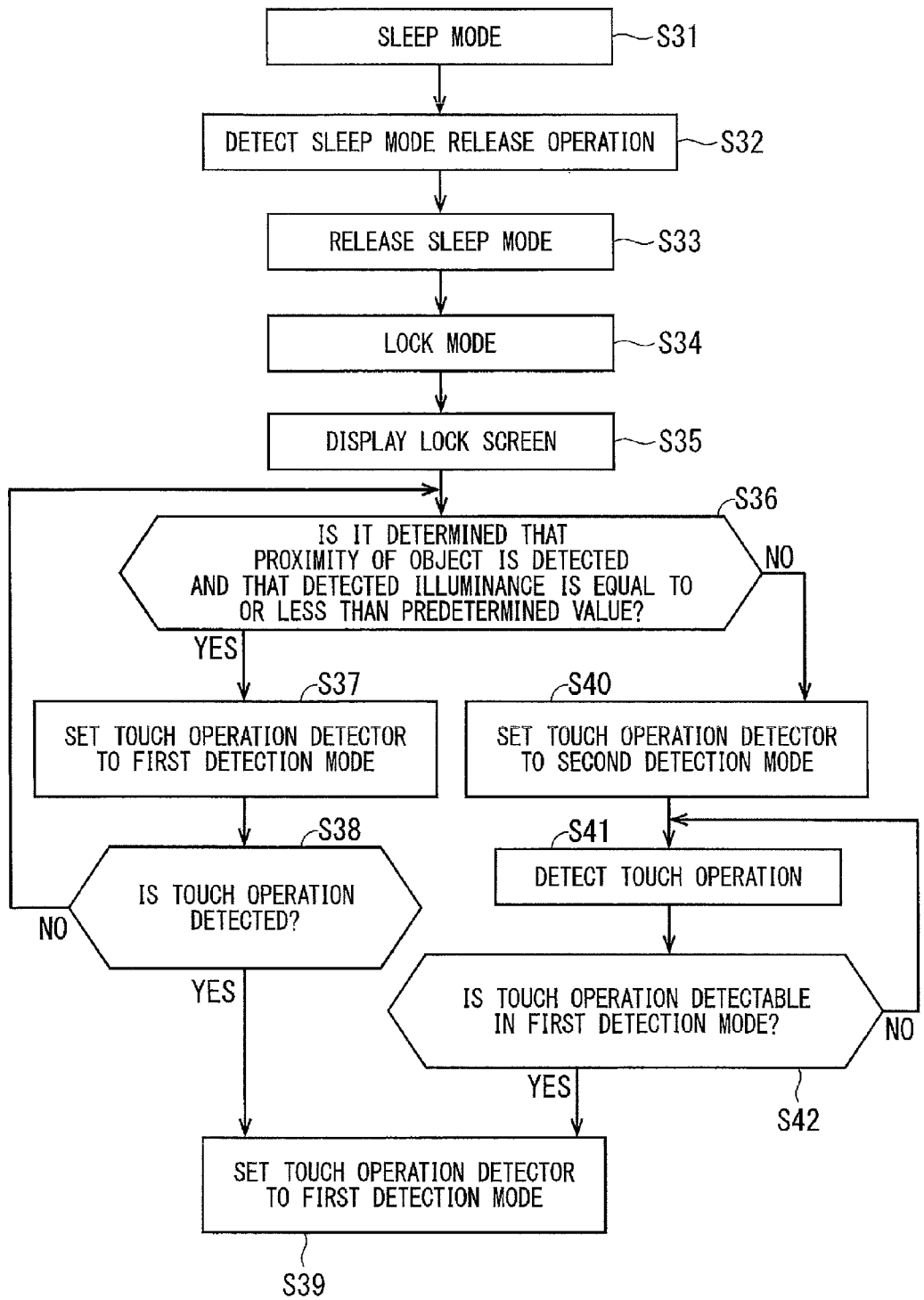

ELECTRONIC APPARATUS AND OPERATING METHOD OF ELECTRONIC APPARATUS

CROSS-REFERENCE TO RELATED APPLICATION

The present application claims priority under 35 U.S.C. §119 to Japanese Patent Application No. 2015-189549, filed on Sep. 28, 2015, entitled "ELECTRONIC APPARATUS AND OPERATING METHOD OF ELECTRONIC APPARATUS". The content of which is incorporated by reference herein in its entirety.

FIELD

Embodiments of the present disclosure relate generally to electronic apparatuses.

BACKGROUND

Various techniques concerning electronic apparatuses have been proposed.

SUMMARY

An electronic apparatus and an operating method of an electronic apparatus are disclosed. In one embodiment, an electronic apparatus comprises a display, a touch detector, a proximity detector, and at least one processor. The display has a display mode including a first display mode in which the display displays no information and a second display mode in which the display displays information. The touch detector has a detection mode including a first detection mode in which the touch detector detects a touch operation performed on a surface of the electronic apparatus at a first sensitivity and a second detection mode in which the touch detector detects the touch operation at a second sensitivity higher than the first sensitivity. The proximity detector is configured to detect proximity of an object to the electronic apparatus. The at least one processor is configured to set the detection mode of the touch detector. When the proximity detector detects the proximity at a switch of the display mode from the first display mode to the second display mode, the at least one processor sets the detection mode to the first detection mode.

An operating method of an electronic apparatus is a method for use in an electronic apparatus having a display mode and a detection mode. The display mode includes a first display mode in which the electronic apparatus displays no information and a second display mode in which the electronic apparatus displays information. The detection mode includes a first detection mode in which the electronic apparatus detects a touch operation performed on a surface of the electronic apparatus at a first sensitivity and a second detection mode in which the electronic apparatus detects the touch operation at a second sensitivity higher than the first sensitivity. The operating method comprises first to third steps. In the first step, the display mode is switched from the first display mode to the second display mode. In the second step, proximity of an object to the electronic apparatus is detected. In the third step, the detection mode is set to the first detection mode if the proximity is detected in the first step.

BRIEF DESCRIPTION OF THE DRAWINGS

FIG. 12 illustrates a flowchart showing an example of the operation of the electronic apparatus.

DETAILED DESCRIPTION

<First Embodiment>
<External Appearance of Electronic Apparatus>

Figure 1:
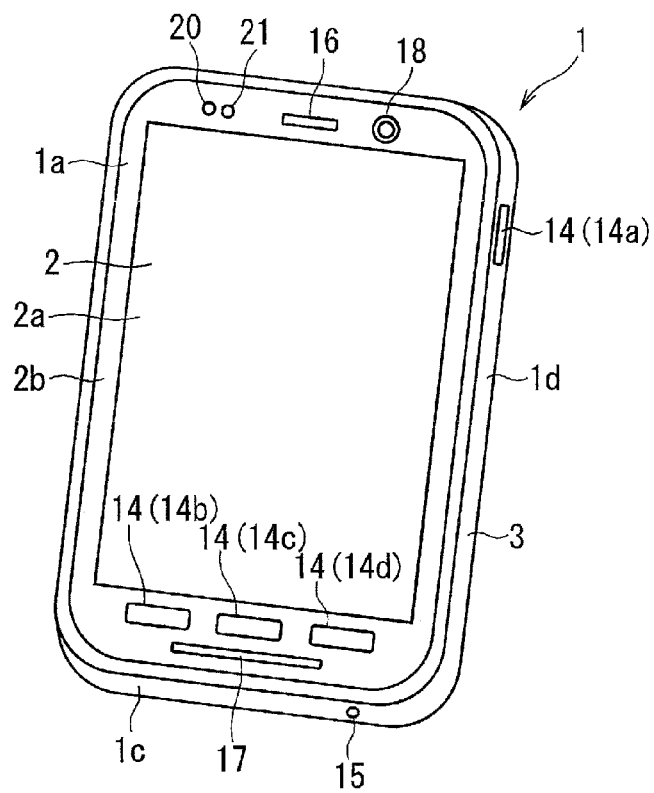
FIG. 1 illustrates a schematic perspective view of an example of an external appearance of an electric apparatus.
Figure 2:
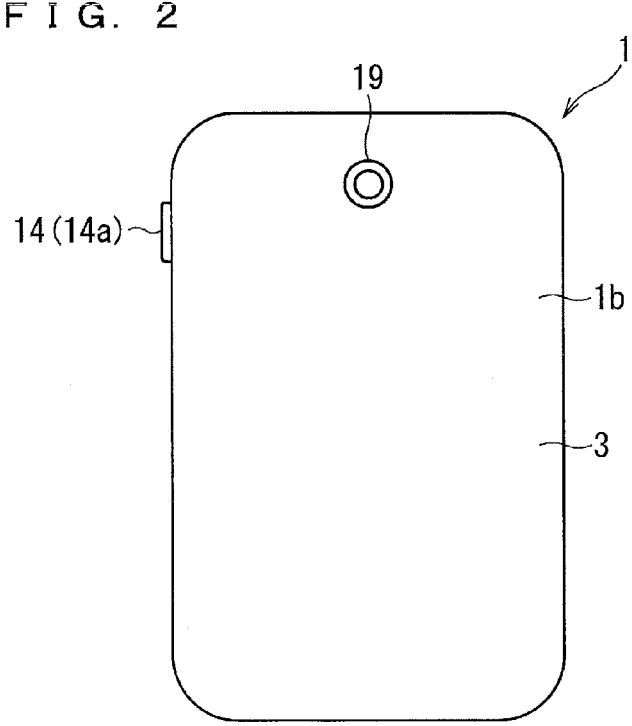
FIG. 2 illustrates a schematic rear view of an example of the external appearance of the electronic apparatus.

FIG. 1 illustrates a schematic perspective view of an example of an external appearance of an electronic apparatus 1. FIG. 2 illustrates a schematic rear view of an example of the external appearance of the electronic apparatus 1. The electronic apparatus 1 is, for example, a mobile phone such as a smartphone. The electronic apparatus 1 can communicate with another communication apparatus via, for example, a base station or a server.

As illustrated in FIGS. 1 and 2, the electronic apparatus 1 includes a cover panel 2 located on a front surface 1a thereof and an apparatus case 3 to which the cover panel 2 is fitted. The cover panel 2 and the apparatus case 3 form the exterior of the electronic apparatus 1. The electronic apparatus 1 has, for example an approximately rectangular plate shape in a plan view.

The cover panel 2 includes a display screen (display area) 2a on which a variety of information such as characters, signs, and graphics is displayed by a display panel 121, which will be described below. That is to say, the display screen 2a is located on the front surface 1a of the electronic apparatus 1. The major part of a peripheral portion 2b of the cover panel 2 that surrounds the display screen 2a is opaque and/or not transparent because of, for example, a film or the like attached thereto. Thus, the major part of the peripheral portion 2b of the cover panel 2 is a non-display area in which the variety of information displayed by the display panel 121 does not appear.

On the rear side of the display screen 2a is provided a touch sensor 130, which will be described below. The user can thus provide various instructions to the electronic apparatus 1 by performing operations on the display screen 2a with an operator such as a finger.

As illustrated in FIG. 1, in the upper edge portion of the cover panel 2 are provided a first transparent part 20, through which a proximity detector 200 is visually recognized from the outside of the electronic apparatus 1, and a second transparent part 21, through which an illuminance detector 210 is visually recognized from the outside of the electronic apparatus 1. The proximity detector 200 and the illuminance detector 210 will be described below. The first transparent part 20 and the second transparent part 21 are aligned side by side in, for example, the transverse direction of the electronic apparatus 1. In the upper edge portion of the cover panel 2, a receiver hole 16 is provided. Also, a third transparent part 18, through which the lens of a front imaging unit 180 is visually recognized form the outside of the electronic apparatus 1, is provided in the upper edge portion of the cover panel 2. The front imaging unit 180 will be described below.

In the lower edge portion of the cover panel 2, a speaker hole 17 is provided. In a bottom surface 1c of the electronic apparatus 1, that is, in the bottom surface (lower side surface) of the apparatus case 3, a microphone hole 15 is provided.

As illustrated in FIG. 2, in a rear surface 1b of the electronic apparatus 1, that is, in the upper edge portion of the rear surface of the apparatus case 3 is provided a fourth transparent part 19, through which the imaging lens of a rear imaging unit 190 is visually recognized form the outside of the electronic apparatus 1. The rear imaging unit 190 will be described below.

The apparatus case 3 accommodates an operation key group 140 including a plurality of operation keys 14. The individual operation keys 14 are hardware keys such as push buttons. The operation keys are also called "operation buttons". The individual operation keys 14 are exposed at the front surface of the electronic apparatus 1. The user can provide various instructions to the electronic apparatus 1 by pressing the individual operation keys 14 with, for example, a finger. The plurality of operation keys 14 include operation keys 14a to 14d.

The operation key 14a is, for example, a power key. The power key is an operation key for suspending part of the functions of the electronic apparatus 1 or restoring (restarting) the suspended function thereof. As illustrated in FIGS. 1 and 2, the operation key 14a is located in a right side surface 1d of the electronic apparatus 1, that is, in the right side surface of the apparatus case 3. The operation key 14a protrudes outwardly from, for example, the right side surface of the apparatus case 3. In response to an operation of the user on the operation key 14a, part of the functions the electronic apparatus 1 are suspended or the suspended function thereof is restored. The operation key 14a is hereinafter also referred to as a "power key 14a".

The operation key 14b is, for example, a back key. The back key is an operation key for replacing the image on the display screen 2a with the immediately preceding image. As illustrated in FIG. 1, the operation key 14b is located in the lower edge portion of the cover panel 2. In response to an operation of the user on the operation key 14b, the image on the display screen 2a is replaced with the immediately preceding image.

The operation key 14c is, for example, a home key. The home key is an operation key for causing a home screen to be displayed on the display screen 2a. As illustrated in FIG. 1, the operation key 14c is located in the lower edge portion of the cover panel 2. In response to an operation of the user on the operation key 14c, the home screen is displayed on the display screen 2a. The operation key 14c is hereinafter also referred to as a "home key".

The operation key 14d is, for example, a history key. The history key is an operation key for causing execution histories of applications in the electronic apparatus 1 to be displayed on the display screen 2a. As illustrated in FIG. 1, the operation key 14d is located in the lower edge portion of the cover panel 2. In response to an operation of the user on the operation key 14d, the execution histories of applications in the electronic apparatus 1 are displayed on the display screen 2a.

<Electrical Configuration of Electronic Apparatus>

Figure 3:
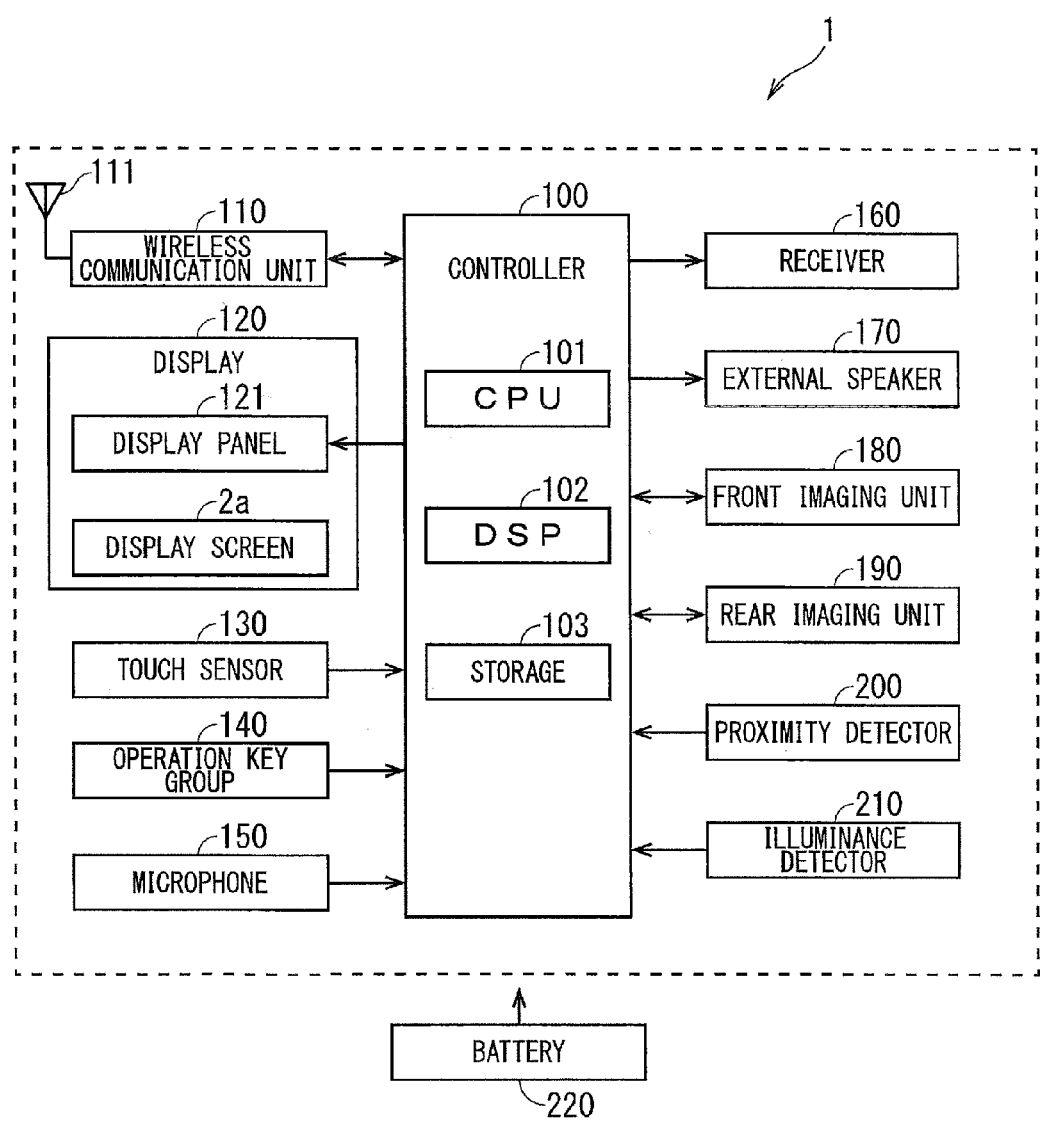
FIG. 3 illustrates an example of the electrical configuration of the electronic apparatus.

FIG. 3 illustrates a block diagram showing an example of the electrical configuration of the electronic apparatus 1. As illustrated in FIG. 3, the electronic apparatus 1 includes a controller 100, a wireless communication unit 110, a display 120, the touch sensor 130, the operation key group 140, a microphone 150, a receiver 160, an external speaker 170, the front imaging unit 180, the rear imaging unit 190, the proximity detector 200, the illuminance detector 210, and a battery 220. The individual constituent elements of the electronic apparatus 1 are accommodated in the apparatus case 3.

The controller 100 can manage the overall operation of the electronic apparatus 1 by controlling other constituent elements of the electronic apparatus 1. The controller 100 includes at least one processor for providing control and processing capability to perform various functions as will be described in further detail below. In accordance with various embodiments, the at least one processor may be implemented as a single integrated circuit (IC) or as multiple communicatively coupled ICs and/or discrete circuits. It is appreciated that the at least one processor can be implemented in accordance with various known technologies.

In one embodiment, the processor includes one or more circuits or units configurable to perform one or more data computing procedures or processes. For example, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein. Herein, the controller 100 includes, for example, a CPU (central processing unit) 101, a DSP (digital signal processor) 102, and a storage 103.

The storage 103 is formed of a non-transitory recording medium that can be read by the CPU 101 and the DSP 102, such as a ROM (Read Only Memory) and a RAM (Random Access Memory). The storage 103 can store, for example, a main program control for controlling the electronic apparatus 1 and a plurality of application programs (hereinafter also simply referred to as "applications"). The CPU 101 and the DSP 102 execute the various control programs in the storage 103, so that the various functions of the controller 100 are performed. The storage 103 stores, for example, a voice call application for performing voice calls and video calls and a camera application for capturing images of subjects using the front imaging unit 180 and the rear imaging unit 190.

The storage 103 may include a non-transitory, computer-readable recording medium other than the ROM and the RAM. The storage 103 may include, for example, a compact hard disk drive and a SSD (solid state drive). Part or all of the functions of the controller 100 may be enabled by a hardware circuit that needs no software to perform the functions thereof.

The wireless communication unit 110 is equipped with an antenna 111. In the wireless communication unit 110, the antenna 111 can receive, via a base station, a signal transmitted from a mobile phone different from the electronic apparatus 1 or a signal transmitted from a communication device such as a web server connected to the Internet. The wireless communication unit 110 can perform amplification and down-conversion on the reception signal received by the antenna 111, and output the resultant signal to the controller 100. The controller 100 can perform demodulation and the like on the input reception signal to acquire information included in the reception signal such as sound signals of voice, music, and the like.

Further, the wireless communication unit 110 can perform up-conversion and amplification on a transmission signal generated by the controller 100, and wirelessly transmit the processed transmission signal from the antenna 111. The transmission signal from the antenna 111 is received, via the base station or the like, by a mobile phone different from the electronic apparatus 1 or a communication device connected to the Internet such as a web server.

The display 120 includes, the display panel 121, the cover panel 2, and the like. The display panel 121 is, for example, a liquid crystal panel or an organic electroluminescent (EL) panel. The display panel 121 is controlled by the controller 100, so that the display panel 121 can display a variety of information such as characters, signs, and graphics. The display panel 121 displays the variety of information on the display screen 2a of the cover panel 2.

The touch sensor 130 can detect an operation (hereinafter referred to as a "touch operation") performed on the display screen 2a on the surface of the electronic apparatus 1 with an operator such as a finger. When the user performs a touch operation on the display screen 2a with an operator such as a finger, the touch sensor 130 inputs an electrical signal corresponding to the operation to the controller 100. The controller 100 can specify, based on the electrical signal input from the touch sensor 130, the purpose of the operation performed on the display screen 2a, and perform processing appropriate to the purpose. The controller 100 and the touch sensor 130 function as a touch detector that can detect a touch operation performed on the display screen 2a.

The touch sensor 130 is, for example, a projected capacitive touch panel. The touch panel is disposed separately from, for example, the display panel 121. In this case, the touch panel is fitted to the rear surface of the cover panel 2. The display panel 121 is fitted to a surface of the touch panel opposite to another surface facing the cover panel 2. This means that the display panel 121 is fitted to the rear surface of the cover panel 2 with the touch panel therebetween.

The touch sensor 130 is not limited to the touch panel disposed separately from the display panel 121, and may be a so-called in-cell touch panel or a so-called on-cell touch panel that is integral with the display panel 121. In this case, the display panel 121 including the touch sensor 130 is fitted to the rear surface of the display screen 2a.

Also, the user can input various instructions to the electronic apparatus 1 by performing operations on the display screen 2a with an operator other than fingers, that is, for example, with a pen for capacitive touch panels such as a stylus pen. The operation of the touch detector detecting a touch operation will be described below in detail.

When receiving an operation of the user, the individual key 14 included in the operation key group 140 outputs, to the controller 100, an operation signal indicating that an operation is performed on the operation key 14. The controller 100 can thus determine, based on the operation signal from the individual operation key 14, whether an operation is performed on the individual operation key 14. The controller 100 can perform processing corresponding to the operation key 14 being the target of the operation.

The operation keys 14b to 14d are not necessarily hardware keys such as push buttons. The operation keys 14b to 14d may be software keys displayed on the display screen 2a. In this case, the touch sensor 130 detects a touch operation performed on the individual software key, so that the controller 100 can perform processing corresponding to the software key being the target of the operation.

The microphone 150 can convert a sound input from the outside of the electronic apparatus 1 into an electrical sound signal, and output the electrical sound signal to the controller 100. The sound from the outside of the electronic apparatus 1 is received by the microphone 150 through, for example, the microphone hole 15 in the bottom surface (lower side surface) of the apparatus case 3.

The external speaker 170 is, for example, a dynamic speaker. The external speaker 170 can convert an electrical sound signal from the controller 100 into a sound, and output the sound. The sound is output from the external speaker 170 to the outside of the electronic apparatus 1 through, for example, the speaker hole 17 in the lower edge portion of the cover panel 2. The sound output through the speaker hole 17 is set to be a degree such that the sound can be heard at a location away from the electronic apparatus 1.

The receiver 160 can output a received sound, and is for example, a dynamic speaker. The receiver 160 can convert an electrical sound signal from the controller 100 into a sound, and output the sound. The sound is output from the receiver 160 to the outside through, for example, the receiver hole 16 in the upper edge portion of the cover panel 2. The volume of the sound output from the receiver hole 16 is set to be lower than the volume of the sound output from, for example, the external speaker 170 through the speaker hole 17.

In place of the receiver 160, a piezoelectric vibrating element may be disposed. The piezoelectric vibrating element can vibrate in accordance with a sound signal from the controller 100. The piezoelectric vibrating element is disposed on, for example, the rear surface of the cover panel 2. The vibrations of the piezoelectric vibrating element based on the sound signal can cause the cover panel 2 to vibrate. When the user moves the cover panel 2 close to an ear, the vibrations of the cover panel 2 are transmitted as voice to the user. The piezoelectric vibrating element provided in place of the receiver 160 eliminates the need for the receiver hole 16.

The front imaging unit 180 and the rear imaging unit 190 each include a lens, an image sensor, and the like. The front imaging unit 180 and the rear imaging unit 190 can individually capture an image of a subject in accordance with the control by the controller 100, create a still image or a moving image of the imaged subject, and output the resultant image to the controller 100. The lens of the front imaging unit 180 can be visually recognized from the third transparent part 18 in the cover panel 2. The front imaging unit 180 can thus capture an image of the subject in front of the cover panel 2 of the electronic apparatus 1, that is, in front of the front surface 1a of the electronic apparatus 1. The lens of the rear imaging unit 190 can be visually recognized from the fourth transparent part 19 in the rear surface 1b of the electronic apparatus 1. The rear imaging unit 190 can thus capture an image of the subject in front of the rear surface 1b of the electronic apparatus 1.

The proximity detector 200 includes, for example, an infrared proximity sensor. The infrared proximity sensor includes a light receiving element and a light emitting element that can emit infrared rays. When the infrared rays emitted by the light emitting element are reflected off an object, the light receiving element can receive the reflected rays. The infrared rays emitted by the light emitting element pass through the first transparent part 20 and are output to the outside of the electronic apparatus 1. The rays reflected off the object pass through the first transparent part 20 and are received by the light receiving element. The amount of rays reflected off the object and received by the light emitting element increases with increasing distance between the proximity sensor and the object. The proximity detector 200 can thus detect the proximity of the object based on a signal output from the light receiving element. When detecting the proximity of the object, the proximity detector 200 inputs, to the controller 100, an electrical signal indicating the proximity of the object. The controller 100 can determine, based on the electrical signal from the proximity sensor 200, whether the object is in close proximity to the electronic apparatus 1.

The illuminance detector 210 includes a light receiving element. The illuminance detector 210 can detect the brightness (illuminance) around the electronic apparatus 1 based on an electrical signal output from the light receiving element of the illuminance detector 210 itself. The rays enter the second transparent part 21, thereby being received by the light receiving element of the illuminance detector 210. The detected illuminance obtained by the illuminance detector 210 is input to the controller 100.

The battery 220 can output power for the electronic apparatus 1. The battery 220 is, for example, a rechargeable battery such as a lithium-ion secondary battery. The battery 220 can supply power to various electronic components of the electronic apparatus 1, such as the controller 100 and the wireless communication unit 110.

<Operation Mode of Electronic Apparatus>

The electronic apparatus 1 has an operation mode including a sleep mode in which part of the functions of the electronic apparatus 1 are suspended and a normal mode in which the sleep mode is released. The functions of the electronic apparatus 1 to be suspended during the operation in the sleep mode include the display function of displaying a variety of information such as an image on the display screen 2a. While the operation mode of the electronic apparatus 1 is set to the sleep mode, some of the constituents of the electronic apparatus 1 including the display panel 121 are placed inactive. The electronic apparatus 1 consumes a smaller amount of power in the sleep mode than in the normal mode. The controller 100 controls a predetermined constituent of the electronic apparatus 1 to perform the setting of the operation mode of the electronic apparatus 1.

If a certain period of time has elapsed with no operation being performed on the electronic apparatus 1 operating in the normal mode, the operation mode of the electronic apparatus 1 is switched from the normal mode to the sleep mode. Also, in response to an operation on the power key 14a of the electronic apparatus 1 operating in the normal mode, the operation mode of the electronic apparatus 1 is switched from the normal mode to the sleep mode.

In response to an operation performed on the power key 14a of the electronic apparatus 1 operating in the sleep mode, the operation mode of the electronic apparatus 1 is switched form the sleep mode to the normal mode. This means that, in response to an operation on the power key 14a in the sleep mode, the function of the electronic apparatus 1 that has been suspended at the switch from the normal mode to the sleep mode is restored. Also, in response to an operation on the home key 14c in the sleep mode, the operation mode of the electronic apparatus 1 is switched from the sleep mode to the normal mode. While the operation mode of the electronic apparatus 1 is set to the sleep mode, the home key 14c functions as the operation key for releasing the sleep mode. The operation for releasing the sleep mode of the electronic apparatus 1 is hereinafter also referred to as a "sleep mode release operation".

<Screen Displayed on Display Screen>

The display 120 has a display mode including a first display mode and a second display mode. In the first display mode, the display panel 121 is inactive, where a variety of information such as characters, signs, and graphics is not displayed on the display screen 2a. In the second display mode, the display panel 121 is active, where the variety of information such as characters, signs, and graphics is displayed on the display screen 2a. While the operation mode of the electronic apparatus 1 is set to the sleep mode, the display panel 121 is inactive, and the display 120 operates in the first display mode accordingly. While the operation mode of the electronic apparatus 1 is set to the normal mode, the display panel 121 is active, and the display 120 operates in the second display mode accordingly.

Figure 4:
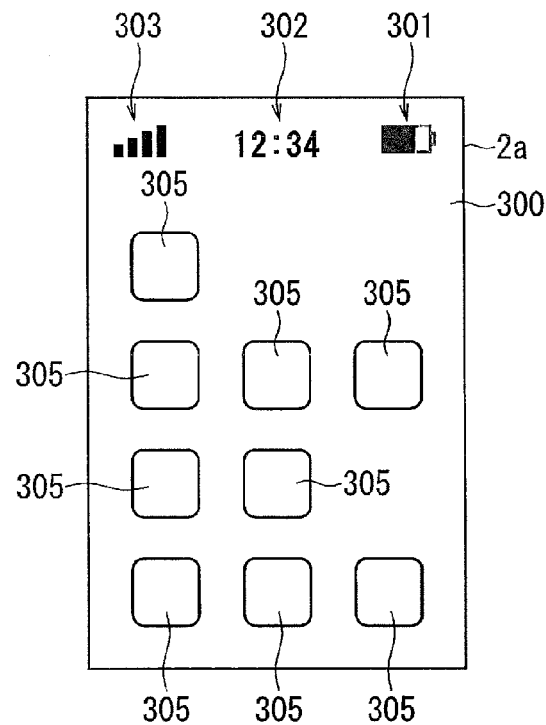
FIG. 4 illustrates an example of display contents displayed on a display screen.
Figure 5:
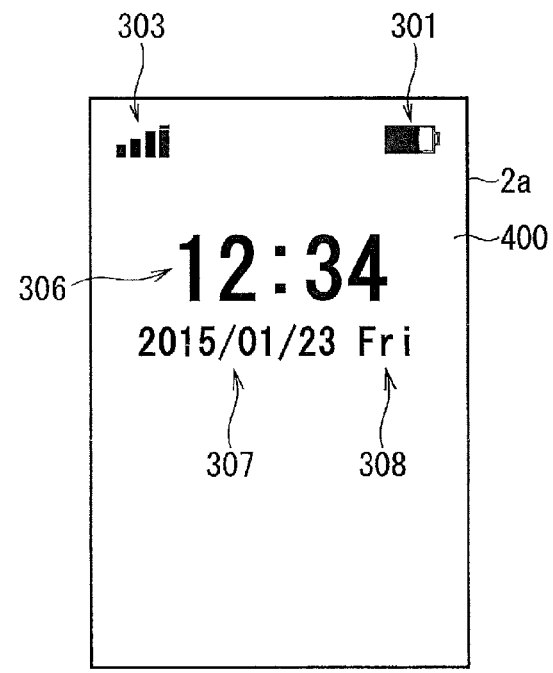
FIG. 5 illustrates an example of display contents displayed on a display screen.

While the operation mode of the electronic apparatus 1 is set to the normal mode, that is, while the display mode of the display 120 is set to the second display mode, various screens can be displayed on the display screen 2a. While the operation mode of the display 120 is set to the second display mode, the home screen, the lock screen, or the like is displayed on the display screen 2a. FIG. 4 is an exemplary illustration of a home screen 300. FIG. 5 is an exemplary illustration of a lock screen 400.

As illustrated in FIG. 4, the home screen 300 shows a remaining battery life icon 301 indicating the current charge status of the battery 220, a current time 302, a reception condition icon (also referred to as a radio wave condition icon) 303 indicating the radio wave reception condition of the wireless communication unit 110. The home screen 300 also shows graphics (hereinafter referred to as "application icons") 305 that are in a one-to-one correspondence with applications and are used to execute corresponding applications. In the example of FIG. 4, nine application icon 305 are shown. In the example of FIG. 4, although the nine application icons 305 are denoted by the same reference number, these application icons 305 are in one-to-one correspondence with the individual applications. When the user performs a predetermined operation on one of the application icons 305, the controller 100 reads, from the storage 103, the application corresponding to the application icon 305 being the target of the operation, and executes the application. Thus, by performing an operation on the individual application icon 305, the user can cause the electronic apparatus 1 to execute the application corresponding to the application icon 305 being the target of the operation. When the user performs an operation on the individual application icon 305 corresponding to the voice call application, the electronic apparatus 1 executes the voice call application. When the user performs an operation on the individual application icon 305 corresponding to the camera application, the electronic apparatus 1 executes the camera application. The application icons 305 can be regarded as software buttons displayed on the display screen 2a.

Examples of operations of the user on the individual application icon 305 include an operation of bringing an operator, such as a finger, close to the application icon 305 and subsequently moving the operator away from the application icon 305. Another example of operations of the user on the individual application icon 305 is an operation of bringing an operator, such as a finger, into contact with the application icon 305 and subsequently moving the operator away from the application icon 305. These operations are so-called tap operations. Tap operations can be performed not only on the application icons 305 but also on a variety of information displayed on the display screen 2a.

As illustrated in FIG. 5, similarly to the home screen 300, the lock screen 400 shows the remaining battery life icon 301 and the reception condition icon 303. The lock screen 400 also shows a current time 306, today's date 307, and today's day of week 308. For example, the lock screen 400 shows the current time 306 in a position different from the position of the current time 302 on the home screen 300 and in a size larger than the current time 302.

Herein, the normal mode of the electronic apparatus 1 includes a lock mode in which the user is inhibited from causing the electronic apparatus 1 to execute the applications in the storage 103 except for the specific applications (e.g., the voice call application and the camera application) or to execute any of the applications in the storage 103. While the operation mode of the electronic apparatus 1 is set to the lock mode, the user is inhibited from instructing the electronic apparatus 1 to execute the individual applications in the storage 103 except for the specific applications or to execute any of the individual applications in the storage 103. While the operation mode of the electronic apparatus 1 is set to the lock mode, the execution of at least part of the functions of the electronic apparatus 1 is restricted. The lock mode can be used to eliminate or reduce malfunctions caused by operations unintended by the user. The lock screen 400 is the screen for notifying that the operation mode of the electronic apparatus 1 is set to the lock mode. The lock screen 400 is displayed on the display screen 2a while the operation mode of the electronic apparatus 1 is set to the lock mode.

When an operation is performed on the power key 14a or the home key 14c of the electronic apparatus 1 operating in the sleep mode, the sleep mode is released, and the operation mode of the electronic apparatus 1 is switched to the lock mode, where the lock screen 400 is displayed on the display screen 2a.

When an operation is performed on the home key 14c of the electronic apparatus 1 operating in the normal mode, not in the lock mode, the home screen 300 is displayed on the display screen 2a.

With the lock screen 400 being displayed on the display screen 2a, when the user performs a predetermined operation on the electronic apparatus 1, the electronic apparatus 1 is released from the lock mode, and the lock screen 400 displayed on the display screen 2a is replaced with another screen such as the home screen 300. The state in which the lock mode is released during the operation in the normal mode is hereinafter referred to as an "unlocked mode". The operation of releasing the lock mode is also referred to as a "lock release operation".

<Lock Release Operation>

Figure 6:
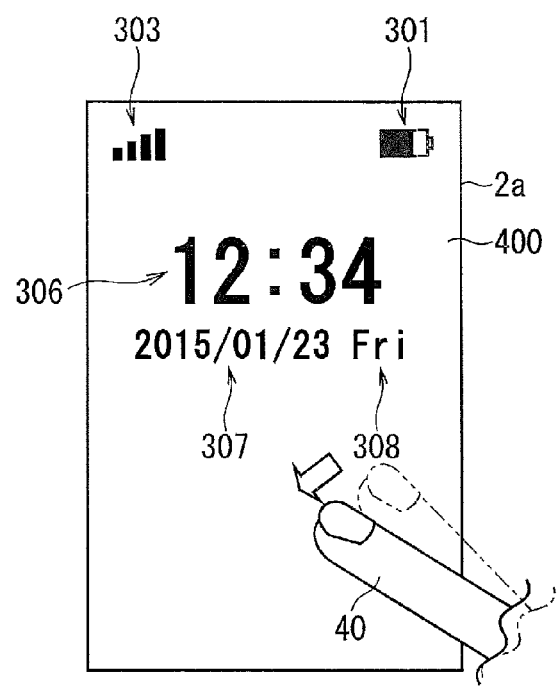
FIG. 6 illustrates an example of the state in which a user operates the electronic apparatus.

The touch detector can detect the lock release operation which is, for example, a flick operation performed on the display screen 2a. FIG. 6 illustrates the state in which the user performs, with a finger 40, a flick operation on the display screen 2a on which the lock screen 400 is displayed.

The flick operation refers to an operation of flicking the display screen 2a with an operator such as a finger. Specifically, when the touch detector detects an operation of moving the operator, which is in contact with or close proximity to the display screen 2a, over a predetermined distance or longer within a predetermined period of time and subsequently releasing the operator from the display screen 2a, the touch detector determines that a flick operation is performed. The distance over which the operator is required to move on the display screen 2a in order for the operation detector to judge that a flick operation is performed is set to for example, several percent of the longitudinal dimension of the display screen 2a.

With the operation mode of the electronic apparatus 1 being set to the lock mode, that is, with the lock screen being displayed by the display 120, when the touch detector detects a flick operation, the lock mode is released and the operation mode of the electronic apparatus 1 is switched from the lock mode to the unlocked mode. The distance over which the operator is required to move on the display screen 2a in order for the touch detector to judge that the lock release operation is performed is also referred to as a "lock release operation distance". In the case where the lock release operation is a flick operation, the lock release operation distance is equal to the distance over which the operator is required to move on the display screen 2a in order for the touch detector to judge that a flick operation is performed. Note that, even in the case where the lock release operation is a flick operation, it is not always required that the lock release operation distance be equal to the distance over which the operator is required to move on the display screen 2a in order for the touch detector to judge that a flick operation is performed.

Also, it is not always required that the touch detector judge that a flick operation is performed when the operator, which is kept in contact with or close proximity to the display screen 2a, is moved over the predetermined distance or longer within the predetermined period of time and is subsequently released from the display screen 2a. Alternatively, the touch detector may judge that a flick operation is performed when the operator, which is kept in contact with or close proximity to the display screen 2a, is moved over the predetermined distance or longer and is subsequently moved at a predetermined speed or higher immediately before being released from the display screen 2a.

Still alternatively, the touch detector may detect the lock release operation which is a flick operation performed on any point in the display screen 2a, or may detect the lock release operation which is a flick operation performed within a predetermined area of the display screen 2a. The touch detector may detect the lock release operation which is a flick operation of moving the operator in any direction, or may detect the lock release operation which is an operation of moving the operator in a predetermined direction.

Figure 7:
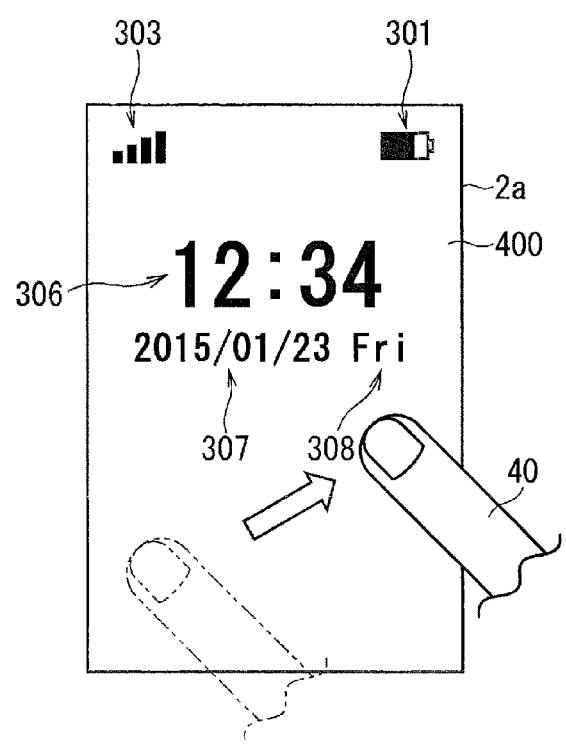
FIG. 7 illustrates an example of the state in which the user operates the electronic apparatus.

It is not always required that the lock release operation be a flick operation. Alternatively, the lock release operation may be a slide operation of moving the operator over a predetermined distance or longer. FIG. 7 illustrates the state in which the user performs, with the finger 40, a slide operation on the display screen 2a on which the lock screen 400 is displayed.

The slide operation refers to an operation of moving an operator such as a finger which is kept in contact with or close proximity to the display screen 2a. That is to say, the slide operation refers to an operation in which the operator slides over the display screen 2a.

With the operation mode of the electronic apparatus 1 being set to the lock mode, that is, with the lock screen being displayed by the display 120, when the touch detector detects a slide operation of moving the operator, which is kept in contact with or close proximity to the display screen 2a, over a predetermined distance or longer, the lock mode is released and the operation mode of the electronic apparatus 1 is switched from the lock mode to the unlocked mode. The lock release operation distance for the lock release operation being a slide operation is set to be longer than the lock release operation distance for the lock release operation being a flick operation. For example, the lock release operation distance for the lock release operation being a slide operation is set to several tens percent of the longitudinal dimension of the display screen 2a.

The touch detector may detect the lock release operation which is a slide operation of moving the operator over a predetermined distance or longer from any point in the display screen 2a, or may detect the lock release operation which is a slide operation of moving the operator over a predetermined distance or longer from a predetermined area of the display screen 2a. Alternatively, the touch detector may detect the lock release operation which is a slide operation of moving the operator over a predetermined distance or longer in any direction, or may detect the lock release operation which is a slide operation of moving the operator over a predetermined distance or longer in a predetermined direction.

Figure 8:
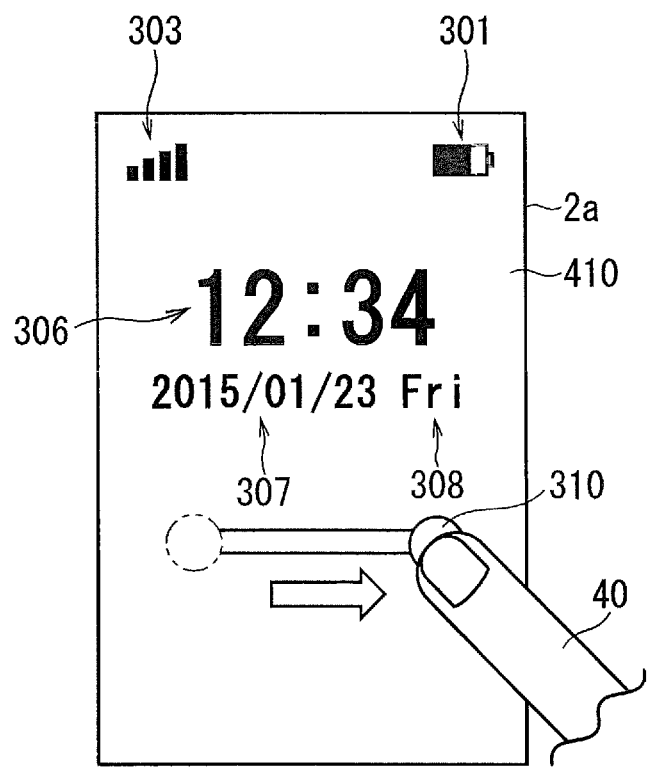
FIG. 8 illustrates an example of the state in which the user operates the electronic apparatus.

Still alternatively, with an unlocking operation button being displayed on the lock screen, the touch detector may detect the lock release operation which is a slide operation of moving the unlocking operation button to a predetermined position. FIG. 8 illustrates the state in which the user performs, with the finger 40, an operation on an unlocking operation button 310 displayed on a lock screen 410. As illustrated in FIG. 8, when the user performs, with the finger 40, a touch operation on the operation button 310 and subsequently performs a slide operation in a predetermined direction, the position of the operation button 310 on the display screen 2a shifts in accordance with the slide operation performed with the finger 40. When the position of the operation button 310 on the display screen 2a reaches the predetermined position, the electronic apparatus 1 is released from the lock mode.

<Sensitivity for Detecting Touch Operation>

The touch detector has a detection mode including a first detection mode in which the touch detector detects a touch operation at a first sensitivity and a second operation mode in which the touch detector detects a touch operation at a second sensitivity higher than the first sensitivity. The detection mode of the touch detector is set by the controller 100. In one embodiment, "the sensitivity for detecting a touch operation is high" with regard to the touch detector means that the threshold value for the touch detector to determine that a touch operation is performed is small, as will be described in detail. Note that "the sensitivity for detecting a touch operation is high" with regard to the touch detector may also mean that the touch sensor 130 detects a touch operation at a high sensitivity.

In a case where the touch sensor 130 is a projective capacitive touch panel, the touch detector can detect an amount of change in capacitance generated between the surface of the touch panel and an operator such as a finger. When the amount of change in capacitance is greater than a predetermined value, the touch detector determines that a touch operation is performed.

When the amount of change in capacitance is greater than a first threshold value, the touch detector in the second detection mode determines that a touch operation is performed. When the amount of change in capacitance is greater than a second threshold value, the touch detector in the first detection mode determines that a touch operation is performed. The second threshold value is set to be greater than the first threshold value. In one embodiment, "a touch operation is detected at the first sensitivity" means that the touch detector determines that a touch operation is performed when the amount of change in capacitance is greater than the second threshold value. "A touch operation is detected at the second sensitivity" means that the touch detector determines that a touch operation is performed when the amount of change in capacitance is greater than the first threshold value. "A touch operation is detected at the first sensitivity" may also mean that the touch detector determines that a touch operation is performed while the touch sensor 130 has a relatively low sensitivity for detecting a touch operation. "A touch operation is detected at the second sensitivity" may also mean that the touch detector determines that a touch operation is performed while the touch sensor 130 has a relatively high sensitivity for detecting a touch operation.

Unlike the touch detector in the first detection mode, the touch detector in the second detection mode determines that a touch operation is performed even if the touch operation is accompanied with a smaller amount of change in capacitance. That is to say, unlike the touch detector in the first detection mode, the touch detector in the second detection mode can readily detect a touch operation. In other words, the touch detector has a higher sensitivity for detecting a touch operation in the second detection mode than in the first detection mode. The first threshold value is set to such a value that a touch operation performed by the user with a gloved finger is detected. The second threshold value is set to such a value that no touch operation performed with a gloved finger is detected and that a touch operation performed with an ungloved finger is detected.

As described above, while the detection mode of the touch detector is set to the second detection mode, the touch detector can readily detect a touch operation. This can improve the operability of the electronic apparatus 1. The first detection mode is hereinafter also referred to as a "low sensitivity mode". The second detection mode is hereinafter also referred to as a "high sensitivity mode".

While the detection mode of the touch detector is set to the high sensitivity mode, the touch detector can readily detect a touch operation, thus being more likely to detect inadvertent touch operations.

In some cases, when not using the electronic apparatus 1, the user sets the operation mode of the electronic apparatus 1 to the sleep mode, and then, puts it in a pocket of the clothes or in the bag. In such a case, the sleep mode is likely to be released in response to an inadvertent operation. In the case where the electronic apparatus 1 in the clothes is released from the sleep mode in response to an inadvertent operation, the touch detector is more likely to detect a touch operation caused by the body (e.g., a leg) of the user via the clothes while operating in the high sensitivity mode than in the low sensitivity mode. In response to such an inadvertent touch operation, the lock mode is likely to be released and a function which is unintended by the user is likely to be executed.

The electronic apparatus 1 can thus determine whether the electronic apparatus 1 itself is put in, for example, a pocket of the clothes. When determining that the electronic apparatus 1 itself is put in, for example, the pocket of the clothes, the electronic apparatus 1 sets the detection mode of the touch detector to the low sensitivity mode. This operation will be described below in detail.

<Operation of Switching Detection Modes of Touch Detector>

Figure 9:
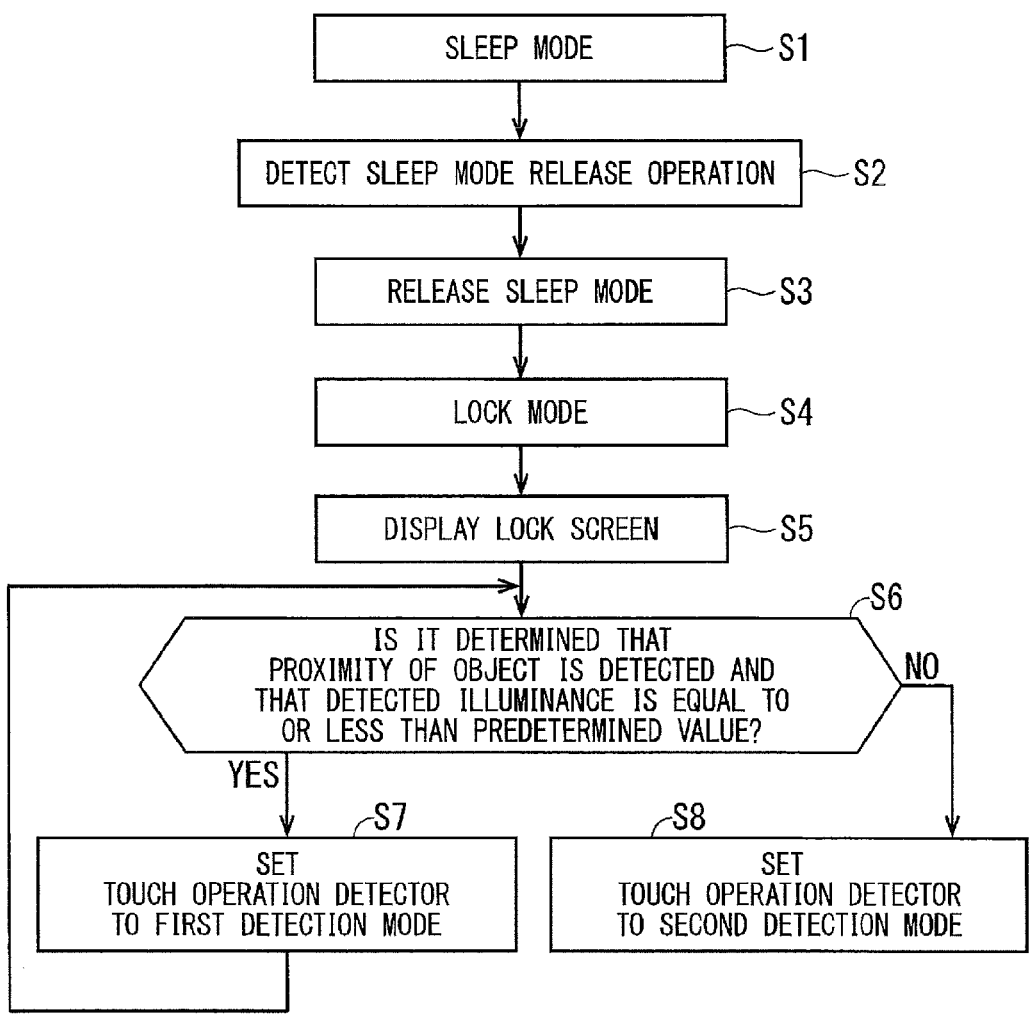
FIG. 9 illustrates a flowchart showing an example of the operation of the electronic apparatus.

FIG. 9 illustrates a flowchart showing an example of the operation of the electronic apparatus 1. As illustrated in FIG. 9, in Step S1, the operation mode of the electronic apparatus 1 is set to the sleep mode. With the operation mode of the electronic apparatus 1 being set to the sleep mode, when the controller 100 detects the sleep mode release operation in Step S2, the sleep mode is released in Step S3. The sleep mode release operation may be an operation performed on at least one of the power key 14a and the home key 14c. If the sleep mode is released in Step S3, in Step S4, the controller 100 sets the operation mode of the electronic apparatus 1 to the lock mode. If the operation mode of the electronic apparatus 1 is set to the lock mode in Step S4, in Step S5, the controller 100 causes the display 120 to display the lock screen 400, which is exemplarily illustrated in FIG. 5.

Subsequently, in Step S6, the controller 100 determines, based on detection signals from the proximity detector 200 and the illuminance detector 210, whether an object is in close proximity to the electronic apparatus 1 and whether the detected illuminance is equal to or less than a predetermined value. In the case where the electronic apparatus 1 is put in the pocket of the clothes or in the bag, the brightness around the electronic apparatus 1 is more likely to be low and the proximity detector 200 is more likely to detect the proximity of an object to the electronic apparatus 1. When the controller 100 determines that an object is in close proximity to the electronic apparatus 1 and that the detected illuminance is equal to or less than the predetermined value, the controller 100 causes the touch detector not to readily detect a touch operation.

If a positive determination is made in Step S6, that is, if the controller 100 determines that an object is in close proximity to the electronic apparatus 1 and that the detected illuminance is equal to or less than the predetermined value, the controller 100 executes Step S7. In Step S7, the controller 100 sets the operation mode of the touch detector to the first detection mode (low sensitivity mode).

Subsequent to Step S7, S6 is executed again. A series of processing of Steps S6 and S7 is repeatedly executed until a negative determination is made in Step S6. A series of processing of Steps S6 and S7 is executed at, for example, predetermined intervals.

If a negative determination is made in Step S6, that is, if the controller 100 fails to determine that the proximity detector 200 detects the proximity of an object and that the detected illuminance detected by the illuminance detector 210 is equal to or less than the predetermined value, the controller executes Step S8. In Step S8, the controller 100 sets the detection mode of the touch detector to the second detection mode (high sensitivity mode). After Step S8, the touch detector remains in the second detection mode (high sensitivity mode) until the operation mode of the electronic apparatus 1 returns to the sleep mode.

As described above, at the switch of the operation mode of the electronic apparatus 1 from the sleep mode to the lock mode, that is, at the switch of the display mode of the display 120 from the first display mode to the second display mode, when the controller 100 determines that the proximity detector 200 detects the proximity of an object and that the detected illuminance detected by the illuminance detector 210 is equal to or less than the predetermined value, the controller 100 sets the detection mode of the touch detector to the low sensitivity mode. Consequently, an inadvertent touch operation caused by an object that is in close proximity to the electronic apparatus 1 can be less likely to be detected while the brightness around the electronic apparatus 1 is low.

Meanwhile, at the switch of the operation mode of the electronic apparatus 1 from the sleep mode to the lock mode, when the controller 100 fails to determine that the proximity detector 200 detects the proximity of an object and that the detected illuminance detected by the illuminance detector 210 is equal to or less than the predetermined value, the controller 100 sets the detection mode of the touch detector to the high sensitivity mode. Consequently, the touch detector can readily detect a touch operation. This can improve the operability of the electronic apparatus 1.

Also, when the controller 100 sets the detection mode of the touch detector to the low sensitivity mode on the basis of its determination that the proximity detector 200 detects the proximity of an object and that the illuminance detected by the illuminance detector 210 is equal to or less than the predetermined value at the switch of the operation mode of the electronic apparatus 1 from the sleep mode to the lock mode, and then, when the controller 100 fails to determine that the proximity detector 200 detects the proximity of an object and that the detected illuminance detected by the illuminance detector 210 is equal to or less than the predetermined value, the controller 100 sets the detection mode of the touch detector to the high sensitivity mode. In this case as well, the touch detector can readily detect a touch operation. This can improve the operability of the electronic apparatus 1.

Alternatively, when the controller 100 fails to determine that the proximity detector 200 detects the proximity of an object at the switch of the operation mode of the electronic apparatus 1 from the sleep mode to the lock mode, the controller 100 may set the detection mode of the touch detector to the high sensitivity mode, regardless of the detected illuminance detected by the illuminance detector 210. Still alternatively, when the controller 100 fails to determine that the detected illuminance detected by the illuminance detector 210 is equal to or less than the predetermined value at the switch of the operation mode of the electronic apparatus 1 from the sleep mode to the lock mode, the controller 100 may set the detection mode of the touch detector to the high sensitivity mode, regardless of the detection result obtained by the proximity detector 200. In these cases as well, the touch detector can readily detect a touch operation. This can improve the operability of the electronic apparatus 1.

Also, when the controller 100 sets the detection mode of the touch detector to the low sensitivity mode on the basis of its determination that the proximity detector 200 detects the proximity of an object and that the illuminance detected by the illuminance detector 210 is equal to or less than the predetermined value at the switch of the operation mode of the electronic apparatus 1 from the sleep mode to the lock mode, and then, when the controller 100 fails to determine that the proximity detector 200 detects the proximity of an object, the controller 100 may set the detection mode of the touch detector to the high sensitivity mode, regardless of the detected illuminance detected by the illuminance detector 210. Also, when the controller 100 sets the detection mode of the touch detector to the low sensitivity mode on the basis of its determination that the proximity detector 200 detects the proximity of an object and that the illuminance detected by the illuminance detector 210 is equal to or less than the predetermined value at the switch of the operation mode of the electronic apparatus 1 from the sleep mode to the lock mode, and then, when the controller 100 fails to determine that the detected illuminance detected by the illuminance detector 210 is equal to or less than the predetermined value, the controller 100 may set the detection mode of the touch detector to the high sensitivity mode, regardless of the detection result obtained by the proximity detector 200. In these cases as well, the touch detector can readily detect a touch operation. This can improve the operability of the electronic apparatus 1.

The proximity detector 200 and the illuminance detector 210 are controlled by the controller 100 so as to operate in the following manner. For example, while the operation mode of the electronic apparatus 1 is set to the sleep mode, the proximity detector 200 and the illuminance detector 210 are placed inactive. When the electronic apparatus 1 is released from the sleep mode, the proximity detector 200 and the illuminance detector 210 are activated. The amount of power consumed by the electronic apparatus 1 can be regulated accordingly. After the operation mode of the electronic apparatus 1 is switched from the sleep mode to the normal mode, the controller 100 keeps the touch detector in the low sensitivity mode until the proximity detector 200 is activated to be ready to detect the proximity of an object and until the illuminance detector 210 is activated to be ready to detect the illuminance. Consequently, an inadvertent touch operation can be much less likely to be detected.

At the switch of the operation mode of the electronic apparatus 1 from the sleep mode to the normal mode, the controller 100 may set the operation mode of the electronic apparatus 1 to the unlocked mode, not to the lock mode. Also in this case, the controller 100 sets the detection mode of the touch detector based on the detection results obtained by the proximity detector 200 and the illuminance detector 210.

<Second Embodiment>

As described above, even if the detection mode of the touch detector is set to the low sensitivity mode, the touch detector detects an inadvertent lock release operation in some cases. In one embodiment, the detection mode of the touch detector is set to the low sensitivity mode, and furthermore, the lock release operation distance is extended, so that such an inadvertent lock release operation can be less likely to be detected.

In one embodiment, the touch detector can set the lock release operation distance to a first distance or to a second distance longer than the first distance. In the case where the lock release operation is a flick operation, the second distance is set to, for example, about ten times the first distance. In the case where the lock release operation is a slide operation, the second distance is set to, for example, several times the first distance.

Figure 10:
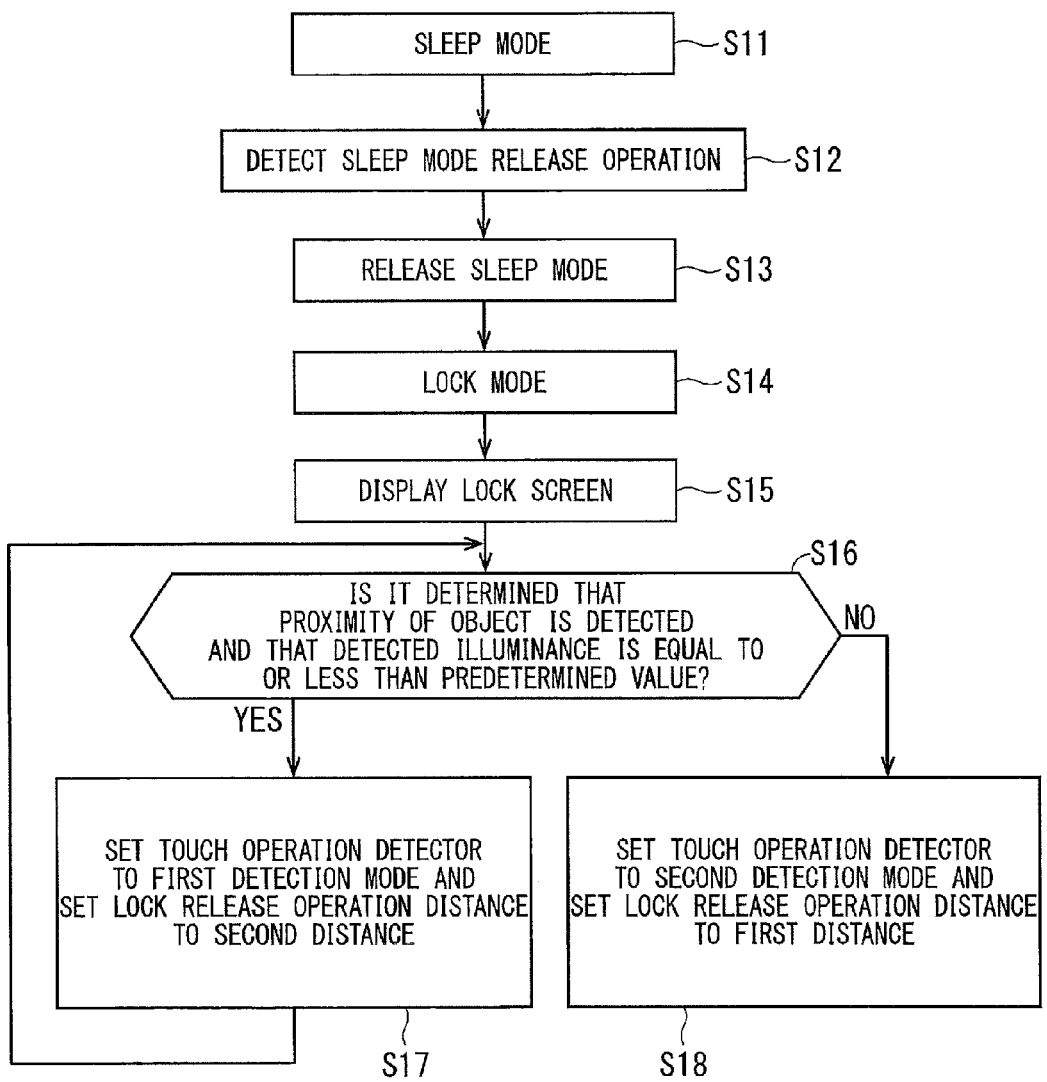
FIG. 10 illustrates a flowchart showing an example of the operation of the electronic apparatus.

FIG. 10 illustrates a flowchart showing an example of the operation of the electronic apparatus 1 according to one embodiment. The processing of Steps S11 to S16 of FIG. 10 is similar to the processing of Steps S1 to S6 of FIG. 9, and the description thereof will not be repeated.

Upon a positive determination in Step S16, Step S17 is executed. In Step S17, the controller 100 sets the detection mode of the touch detector to the first detection mode (low sensitivity mode) and sets the lock release operation distance, for the lock release operation to be detected by the touch detector, to the second distance.

Subsequent to Step S17, Step S16 is executed again. A series of processing of Steps S16 and S17 is repeated until a negative determination is made in Step S16. A series of processing of Steps S16 and S17 is executed at, for example, predetermined intervals.

Upon a negative determination in Step S16, meanwhile, Step S18 is executed. In Step S18, the controller 100 sets the detection mode of the touch detector to the second detection mode (high sensitivity mode) and sets the lock release operation distance, for the lock release operation to be detected by the touch detector, to the first distance. After Step S18, the touch detector remains in the second detection mode (high sensitivity mode) and the lock release operation distance, for the lock release operation to be detected by the touch detector, remains to be equal the first distance until the operation mode of the electronic apparatus 1 returns to the sleep mode.

As described above, at the switch of the operation mode of the electronic apparatus 1 from the sleep mode to the lock mode, that is, at the switch of the display mode of the display from the first display mode to the second display mode, when the controller 100 determines that the proximity detector 200 detects the proximity of an object and that the detected illuminance detected by the illuminance detector 210 is equal to or less than the predetermined value, the controller 100 sets the detection mode of the touch detector to the low sensitivity mode and sets the lock release operation distance, for the lock release operation to be detected by the touch detector, to the second distance. Consequently, in the case where the proximity detector 200 detects the proximity of an object and the illuminance detected by the illuminance detector is equal to or less than the predetermined value, an inadvertent touch operation can be much less likely to be detected by the touch detector.

Meanwhile, when the controller 100 fails to determine that the proximity detector 200 detects the proximity of an object and that the detected illuminance detected by the illuminance detector 210 is equal to or less than the predetermined value at the switch of the operation mode of the electronic apparatus 1 form the sleep mode to the lock mode, the controller 100 sets the detection mode of the touch detector to the high sensitivity mode and sets the lock release operation distance, for the lock release operation to be detected by the touch detector, to the first distance. Consequently, the touch detector can readily detect a touch operation. This can improve the operability of the electronic apparatus 1.

Also, when the controller 100 sets the detection mode of the touch detector to the low sensitivity mode and sets the lock release operation distance, for the lock release operation to be detected by the touch detector, to the second distance on the basis of its determination that the proximity detector 200 detects the proximity of an object and that the illuminance detected by the illuminance detector 210 is equal to or less than the predetermined value at the switch to the lock mode subsequent to the release of the electronic apparatus 1 from the sleep mode, and then, when the controller 100 fails to determine that the proximity detector 200 detects the proximity of an object and that the detected illuminance detected by the illuminance detector 210 is equal to or less than the predetermined value, the controller 100 sets the detection mode of the touch detector to the high sensitivity mode and sets the lock release operation distance, for the lock release operation to be detected by the touch detector, to the second distance. In this case as well, the touch detector can readily detect a touch operation. This can improve the operability of the electronic apparatus 1.

Alternatively, when the controller 100 fails to determine that the proximity detector 200 detects the proximity of an object at the switch of the operation mode of the electronic apparatus 1 from the sleep mode to the lock mode, the controller 100 may set the detection mode of the touch detector to the high sensitivity mode and set the lock release operation distance, for the lock release operation to be detected by the touch detector, to the second distance, regardless of the detected illuminance detected by the illuminance detector 210. Still alternatively, when the controller 100 fails to determine that the detected illuminance detected by the proximity detector 200 is equal to or less than the predetermined value at the switch of the operation mode of the electronic apparatus 1 form the sleep mode to the lock mode, the controller 100 may set the detection mode of the touch detector to the high sensitivity mode and set the lock release operation distance, for the lock release operation to be detected by the touch detector, to the second distance, regardless of the detection result obtained by the proximity sensor 200.

Also, when the controller 100 sets the detection mode of the touch detector to the low sensitivity mode and sets the lock release operation distance, for the lock release operation to be detected by the touch detector, to the second distance on the basis of its determination that the proximity detector 200 detects the proximity of an object and that the illuminance detected by the illuminance detector 210 is equal to or less than the predetermined value at the switch of the operation mode of the electronic apparatus 1 from the sleep mode to the lock mode, and then, when the controller 100 fails to determine that the proximity detector 200 detects the proximity of an object, the controller 100 may set the detection mode of the touch detector to the high sensitivity mode and set the lock release operation distance, for the lock release operation to be detected by the touch detector, to the second distance, regardless of the detected illuminance detected by the illuminance detector 210. Also, when the controller 100 sets the detection mode of the touch detector to the low sensitivity mode and sets the lock release operation distance, for the lock release operation to be detected by the touch detector, to the second distance on the basis of its determination that the proximity detector 200 detects the proximity of an object and that the illuminance detected by the illuminance detector 210 is equal to or less than the predetermined value at the switch of the operation mode of the electronic apparatus 1 from the sleep mode to the lock mode, and then, when the controller 100 fails to determine that the detected illuminance detected by the illuminance detector 210 is equal to or less than the predetermined value, the controller 100 may set the detection mode of the touch detector to the high sensitivity mode and set the lock release operation distance, for the lock release operation to be detected by the touch detector, to the second distance, regardless of the detection result obtained by the proximity detector 200. In these cases as well, the touch detector can readily detect a touch operation. This can improve the operability of the electronic apparatus 1.

In one embodiment, the controller 100 sets, based on detection signals from the proximity detector 200 and the illuminance detector 210, the lock release operation distance and the detection mode of the touch detector. Alternatively, the controller 100 may set the lock release operation distance, without setting the detection mode of the touch detector.

<Third Embodiment>

In one embodiment, the controller 100 sets the detection mode of the touch detector based on a detection signal associated with the touch operation detected by the touch detector.

Figure 11:
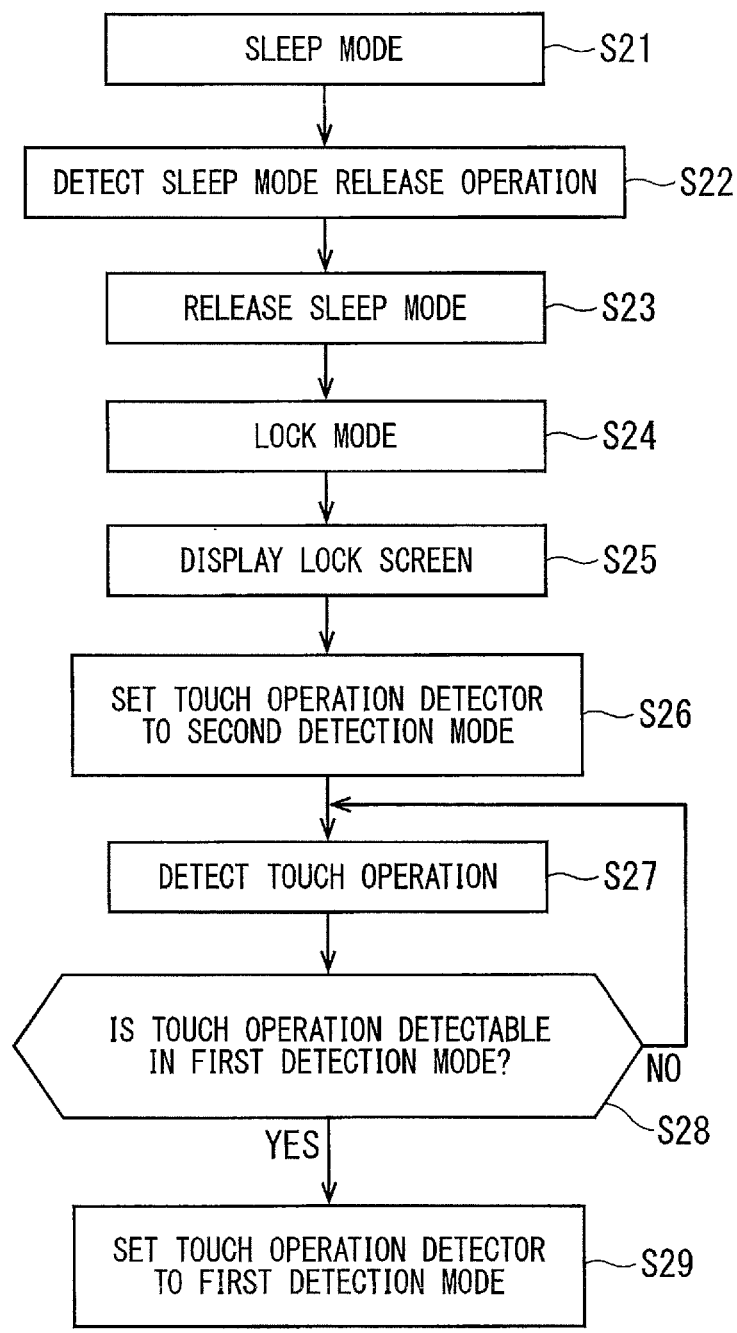
FIG. 11 illustrates a flowchart showing an example of the operation of the electronic apparatus.

FIG. 11 illustrates a flowchart showing an example of the operation of the electronic apparatus 1 according to one embodiment. The processing of Steps S21 to S25 of FIG. 11 is similar to the processing of Step S1 to S5 of FIG. 9, and the description thereof will not be repeated.

In Step S26, the controller 100 sets the detection mode of the touch detector to the second detection mode (high sensitivity mode). Subsequent to Step S26, when a touch operation is detected at the second detection mode in Step S27, Step S28 is executed.

In Step S28, the controller 100 determines, based on a detection signal from the touch detector, whether a touch operation detected by the touch detector in the second detection mode is detectable by the touch detector in the first detection mode. Specifically, if the amount of change in capacitance is greater than the first threshold value, the touch detector in the second detection mode determines that a touch operation is performed. Also, if the amount of change in capacitance is greater than the second threshold value, the touch detector in the second detection mode can determine that a touch operation is performed. If the amount of change in capacitance detected by the touch detector in the second detection mode is greater than the second threshold value, the controller 100 determines that the relevant amount of change in capacitance is detectable by the touch detector in the first detection mode. The controller 100 functions as a determination unit that can determine, based on a detection signal from the touch detector, whether a touch operation detected by the touch detector in the second detection mode is detectable by the touch detector in the first detection mode.

Upon a positive determination in Step S28, Step S29 is executed. In Step S29, the controller 100 sets the detection mode of the touch detector to the first detection mode (low sensitivity mode). After Step S29, the touch detector remains in the first detection mode (low sensitivity mode) until the operation mode of the electronic apparatus 1 returns to the sleep mode.

Upon a negative determination in Step S28, meanwhile, Step S27 is executed again. From that time forward, the electronic apparatus 1 operates similarly to the above. That is to say, after the detection mode of the touch detector is set to the second detection mode (high sensitivity mode) in Step S26, the touch detector remains in the second detection mode (high sensitivity mode) until a positive determination is made in Step S28.

As described above, when the touch detector in the high sensitivity mode detects a touch operation, the controller 100 determines, based on a detection signal from the touch detector, whether the detected touch operation is detectable by the touch detector in the low sensitivity mode. If the controller 100 determines that the detected touch operation is detectable by the touch detector in the low sensitivity mode, the controller 100 sets the detection mode of the touch detector to the low sensitivity mode. Thus, the sensitivity of the touch detector for detecting a touch operation can be suitably adjusted. Consequently, an inadvertent touch operation can be less likely to be detected.

In one embodiment, the detection mode of the touch detector may be set based on the detection results obtained by the proximity detector 200 and the illuminance detector 210 as in FIG. 9.

FIG. 12 illustrates a flowchart showing an example of the operation of the electronic apparatus 1 in setting the detection mode of the touch detector based on the detection results obtained by the proximity detector 200 and the illuminance detector 210 and on a detection signal associated with a touch operation detected by the touch detector. The processing of Steps S31 to S36 of FIG. 12 is similar to the processing of Steps S1 to S6 of FIG. 9, and the description thereof will not be repeated.

Upon a positive determination in Step S36, Step S37 is executed. In Step S37, the controller 100 sets the detection mode of the touch detector to the first detection mode (low sensitivity mode).

Subsequent to Step S37, Step S38 is executed. In Step S38, the controller 100 determines whether a touch operation is detected by the touch detector in the first detection mode (low sensitivity mode). Upon a positive determination in Step S38, Step S39 is executed. In Step S39, the controller 100 sets the detection mode of the touch detector to the first detection mode (low sensitivity mode). In Step S39, which is executed subsequently to Step S38, the controller 100 causes the touch detector to remain in the first detection mode (low sensitivity mode). After Step S39, the touch detector remains in the first detection mode (low sensitivity mode) until the operation mode of the electronic apparatus 1 returns to the sleep mode. Upon a negative determination in Step S38, meanwhile, Step S36 is executed again.

Upon a negative determination in Step S36, Step S40 is executed. Subsequent to Step S40, when a touch operation is detected by the touch detector in the second detection mode in Step S41, Step S42 is executed. In Step S42, the controller 100 determines, based on a detection signal from the touch detector, whether the touch operation detected by the touch detector in the second detection mode is detectable by the touch detector in the first detection mode. The processing of Step S42 is similar to the processing of Step S28 of FIG. 11, and the detailed description thereof will be omitted. Upon a positive determination in Step S42, Step S39 is executed. In Step S39, the controller 100 sets the detection mode of the touch detector to the first detection mode (low sensitivity mode). Upon a negative determination in Step S42, meanwhile, Step S41 is executed again.

Also in one embodiment, when setting the detection mode of the touch detector to the first detection mode (low sensitivity mode) in Steps S37 and S39 of FIG. 12, the controller 100 may set the lock release operation distance to the second distance. When setting the detection mode of the touch detector to the second detection mode (high sensitivity mode) in Step S40 of FIG. 12, the controller 100 may set the lock release operation distance to the first distance.

<Various Modifications>

The following will describe various modifications.

<First Modification>

In some embodiments above, the controller 100 sets at least one of the lock release operation distance and the detection mode of the touch detector based on detection results obtained by the proximity detector 200 and the illuminance detector 210. Alternatively, the controller 100 may set at least one of the lock release operation distance and the detection mode of the touch detector based on a detection result obtained by the proximity detector 200, regardless of a detection result obtained by the illuminance detector 210.

For example, in Step S6 of FIG. 9, the controller 100 determines whether the proximity detector 200 detects the proximity of an object instead of determining both whether the proximity detector 200 detects the proximity of an object and whether the detected illuminance detected by the illuminance detector 210 is equal to or less than the predetermined value. The operation illustrated in FIG. 9 except for Step S6 holds true for one modification, and the description thereof will be omitted. Also, in Step S16 of FIG. 10, the controller 100 may determine whether the proximity detector 200 detects the proximity of an object instead of determining both whether the proximity detector 200 detects the proximity of an object and whether the detected illuminance detected by the illuminance detector 210 is equal to or less than the predetermined value. Also, in Step S36 of FIG. 12, the controller 100 may determine whether the proximity detector 200 detects the proximity of an object instead of determining both whether the proximity detector 200 detects the proximity of an object and whether the detected illuminance detected by the illuminance detector 210 is equal to or less than the predetermined value.

<Second Modification>

In a case where the electronic apparatus 1 includes an acceleration detector that can detect the acceleration of the electronic apparatus 1, the controller 100 may set at least one of the lock release operation distance and the detection mode of the touch detector based on a detection result obtained by the acceleration detector. For example, the controller 100 can determine, based on a change in the detection result obtained by the acceleration detector, whether the user is walking or whether the user is running. When the controller 100 determines that the user is walking or that the user is running, the user is probably not using the electronic apparatus 1. When the controller 100 determines that the user is walking or that the user is running, the controller 100 sets the detection mode of the touch detector to the low sensitivity mode and/or sets the lock release operation distance to the second distance. Consequently, an inadvertent touch operation can be less likely to be detected.

The controller 100 determines whether the user is walking or whether the user is running in, for example, Step S6 of FIG. 9, Step S16 of FIG. 10, and Step S36 of FIG. 12, where the processing originally performed in the respective steps is replaced with making such a determination.

<Third Modification>

The controller 100 may determine, based on a detection result obtained by the acceleration detector, whether the electronic apparatus 1 remains at rest for a predetermined period of time or longer, and may set at least one of the lock release operation distance and the detection mode of the touch detector based on the determination result. When the controller 100 determines that the electronic apparatus 1 remains at rest for the predetermined period of time or longer, the user is probably not using the electronic apparatus 1. When the controller 100 determines that the electronic apparatus 1 remains at rest for the predetermined period of time or longer, the controller 100 sets the detection mode of the touch detector to the low sensitivity mode and/or sets the lock release operation distance to the second distance. Consequently, an inadvertent touch operation can be less likely to be detected.

The controller 100 determines whether the electronic apparatus 1 remains at rest for the predetermined period of time or longer in, for example, Step S6 of FIG. 9, Step S16 of FIG. 10, and Step S36 of FIG. 12, where the processing originally performed in the respective steps are replaced with making such a determination.

Although some embodiments are applied to mobile phones such as smartphones in the above description, the techniques of the present disclosure are also applicable to other electronic apparatuses including touch panels. The techniques of the present disclosure are applicable to, for example, electronic apparatuses such as personal computers and tablet terminals.

While the electronic apparatus 1 has been described above in detail, the above description is in all aspects illustrative and not restrictive. Also, various modifications described above are applicable in combination as long as they are consistent with each other. It is understood that numerous modifications which have not been exemplified can be devised without departing from the scope of the present disclosure.

What is claimed is:

1. An electronic apparatus comprising:
   a display having a display mode including a first display mode in which the display displays no information and a second display mode in which the display displays information;

a touch detector having a detection mode including a first detection mode in which the touch detector detects a touch operation performed on a surface of the electronic apparatus at a first sensitivity and a second detection mode in which the touch detector detects the touch operation at a second sensitivity higher than the first sensitivity;

a proximity detector configured to detect proximity of an object to the electronic apparatus;

at least one processor configured to set the detection mode of the touch detector, wherein when the proximity detector detects the proximity at a switch of the display mode from the first display mode to the second display mode, the at least one processor sets the detection mode to the first detection mode; and an illuminance detector configured to detect an illuminance, wherein when the proximity detector detects the proximity and a detected illuminance detected by the illuminance detector is equal to or less than a predetermined value at the switch of the display mode from the first display mode to the second display mode, the at least one processor sets the detection mode to the first detection mode.

2. The electronic apparatus according to claim 1, wherein when the proximity detector fails to detect the proximity at the switch of the display mode from the first display mode to the second display mode, the at least one processor sets the detection mode to the second detection mode.

3. The electronic apparatus according to claim 2, wherein when the touch detector in the second detection mode detects the touch operation, the at least one processor determines, based on a detection signal from the touch detector, whether the touch operation is detectable by the touch detector in the first detection mode, and when determining that the touch operation is detectable by the touch detector in the first detection mode, the at least one processor sets the detection mode to the first detection mode.

4. The electronic apparatus according to claim 1, wherein when the proximity detector detects the proximity at the switch of the display mode from the first display mode to the second display mode, and then, when the proximity detector fails to detect the proximity, the at least one processor sets the detection mode to the second detection mode.

5. The electronic apparatus according to claim 1, wherein when the proximity detector detects the proximity at the switch of the display mode from the first display mode to the second display mode, and then, when the proximity detector fails to detect the proximity before the touch detector detects the touch operation, the at least one processor sets the detection mode to the second detection mode.

6. The electronic apparatus according to claim 1, wherein the electronic apparatus has an operation mode including a lock mode in which execution of a predetermined function of the electronic apparatus is restricted and an unlocked mode in which the execution of the predetermined function is unrestricted, the at least one processor is configured to set the operation mode, when the display mode is switched from the first display mode to the second display mode, the at least one processor sets the operation mode to the lock mode, while the operation mode is set to the lock mode, the display displays a lock screen indicating that the operation mode is set to the lock mode, in the case where the display displays the lock screen, when the touch detector detects the touch operation of moving an operation point over a predetermined distance or longer from an operation starting point, the at least one processor sets the operation mode to the unlocked mode, when the proximity detector fails to detect the proximity, the predetermined distance is set to a first distance, and when the proximity detector detects the proximity, the predetermined distance is set to a second distance longer than the first distance.

7. The electronic apparatus according to claim 1, wherein when the proximity detector fails to detect the proximity at the switch of the display mode from the first display mode to the second display mode, the at least one processor sets the detection mode to the second detection mode.

8. The electronic apparatus according to claim 7, wherein when the touch detector in the second detection mode detects the touch operation, the at least one processor determines whether the touch operation is detectable by the touch detector in the first detection mode, and when determining that the touch operation is detectable by the touch detector in the first detection mode, the at least one processor sets the detection mode to the first detection mode.

9. The electronic apparatus according to claim 1, wherein when the proximity detector detects the proximity at the switch of the display mode from the first display mode to the second display mode, and then, when the proximity detector fails to detect the proximity, the at least one processor sets the detection mode to the second detection mode.

10. The electronic apparatus according to claim 1, wherein when the proximity detector detects the proximity at the switch of the display mode from the first display mode to the second display mode, and then, when the proximity detector fails to detect the proximity before the touch detector detects the touch operation, the at least one processor sets the detection mode to the second detection mode.

11. The electronic apparatus according to claim 1, wherein when the detected illuminance is more than the predetermined value at the switch of the display mode from the first display mode to the second display mode, the at least one processor sets the detection mode to the second detection mode.

12. The electronic apparatus according to claim 1, wherein when the detected illuminance is equal to or less than the predetermined value at the switch of the display mode from the first display mode to the second display mode, and then, when the detected illuminance exceeds the predetermined value, the at least one processor sets the detection mode to the second detection mode.

13. The electronic apparatus according to claim 1, wherein when the detected illuminance is equal to or less than the predetermined value at the switch of the display mode from the first display mode to the second display mode, and then, when the detected illuminance exceeds the predetermined value before the touch detector detects the touch operation, the at least one processor sets the detection mode to the second detection mode.

14. The electronic apparatus according to claim 1, wherein when the proximity detector fails to detect the proximity and/or the detected illuminance is more than the predetermined value at the switch of the display mode from the first display mode to the second display mode, the at least one processor sets the detection mode to the second detection mode.

15. The electronic apparatus according to claim 1, wherein when the proximity detector detects the proximity and the detected illuminance is equal to or less than the predetermined value at the switch of the display mode from the first display mode to the second display mode, and then, when the proximity detector fails to detect the proximity and/or the detected illuminance exceeds the predetermined value, the at least one processor sets the detection mode to the second detection mode.

16. The electronic apparatus according to claim 1, wherein when the proximity detector detects the proximity and the detected illuminance is equal to or less than the predetermined value at the switch of the display mode from the first display mode to the second display mode, and then, when the proximity detector fails to detect the proximity and/or the detected illuminance exceeds the predetermined value before the touch detector detects the touch operation, the at least one processor sets the detection mode to the second detection mode.

17. The electronic apparatus according to claim 1, wherein the electronic apparatus has an operation mode including a lock mode in which execution of a predetermined function of the electronic apparatus is restricted and an unlocked mode in which the execution of the predetermined function is unrestricted, the at least one processor is configured to set the operation mode, when the display mode is switched from the first display mode to the second display mode, the at least one processor sets the operation mode to the lock mode, while the operation mode is set to the lock mode, the display displays a lock screen indicating that the operation mode is set to the lock mode, in the case where the display displays the lock screen, when the touch detector detects the touch operation of moving an operation point over a predetermined distance or longer from an operation starting point, the at least one processor sets the operation mode to the unlocked mode, when the proximity detector fails to detect the proximity and/or the detected illuminance is more than the predetermined value, the predetermined distance is set to a first distance, and when the proximity detector detects the proximity and the detected illuminance is equal to or less than the predetermined value, the predetermined distance is set to a second distance longer than the first distance.

18. An electronic apparatus comprising:
a display having a display mode including a first display mode in which the display displays no information and a second display mode in which the display displays information;
a touch detector having a detection mode including a first detection mode in which the touch detector detects a touch operation performed on a surface of the electronic apparatus at a first sensitivity and a second detection mode in which the touch detector detects the touch operation at a second sensitivity higher than the first sensitivity;
a proximity detector configured to detect proximity of an object to the electronic apparatus; and
at least one processor configured to set the detection mode of the touch detector,
wherein when the proximity detector detects the proximity at a switch of the display mode from the first display mode to the second display mode, the at least one processor sets the detection mode to the first detection mode, regardless of variation in the electrostatic capacitance between the proximity detector and the object.

* * * * *